United States Patent [19]
Gaeke

[11] 3,752,251
[45] Aug. 14, 1973

[54] ROAD GRADE SENSOR

[75] Inventor: Edward G. Gaeke, Dayton, Ohio

[73] Assignee: General Motors Corporation, Detroit, Mich.

[22] Filed: Aug. 17, 1971

[21] Appl. No.: 172,507

Related U.S. Application Data

[62] Division of Ser. No. 883,386, Dec. 9, 1969, Pat. No. 3,632,176.

[52] U.S. Cl..................... 180/104, 73/514, 180/82 R
[51] Int. Cl.............................................................. B60t 8/16
[58] Field of Search..................... 303/21 CG, 24 A; 188/181 A; 73/514, 516 R, 517 R; 180/104, 103, 82

[56] References Cited
UNITED STATES PATENTS

| | | | |
|---|---|---|---|
| 2,262,008 | 11/1941 | Kollsman | 73/514 |
| 3,588,188 | 6/1971 | Shattock | 303/21 CG |
| 2,797,911 | 7/1957 | Montgomery | 73/516 R |
| 3,422,439 | 1/1969 | Grubaugh | 73/516 |

Primary Examiner—Kenneth H. Betts
Assistant Examiner—John McCormack
Attorney—W. E. Finken and D. D. McGraw

[57] ABSTRACT

A vehicle wheel brake system in which vehicle and wheel speed signals are generated and utilized to generate a wheel brake pressure command signal, with the road grade sensor generating a signal reflecting the grade of the road on which the vehicle is moving. The road grade signal is used to further refine the command signal by taking into account the road grade. The system also senses brake torque and refines the command signal by considering the effect of changes in brake torque. The command signal controls mechanism, which, in turn, controls the wheel brake apply pressures.

2 Claims, 10 Drawing Figures

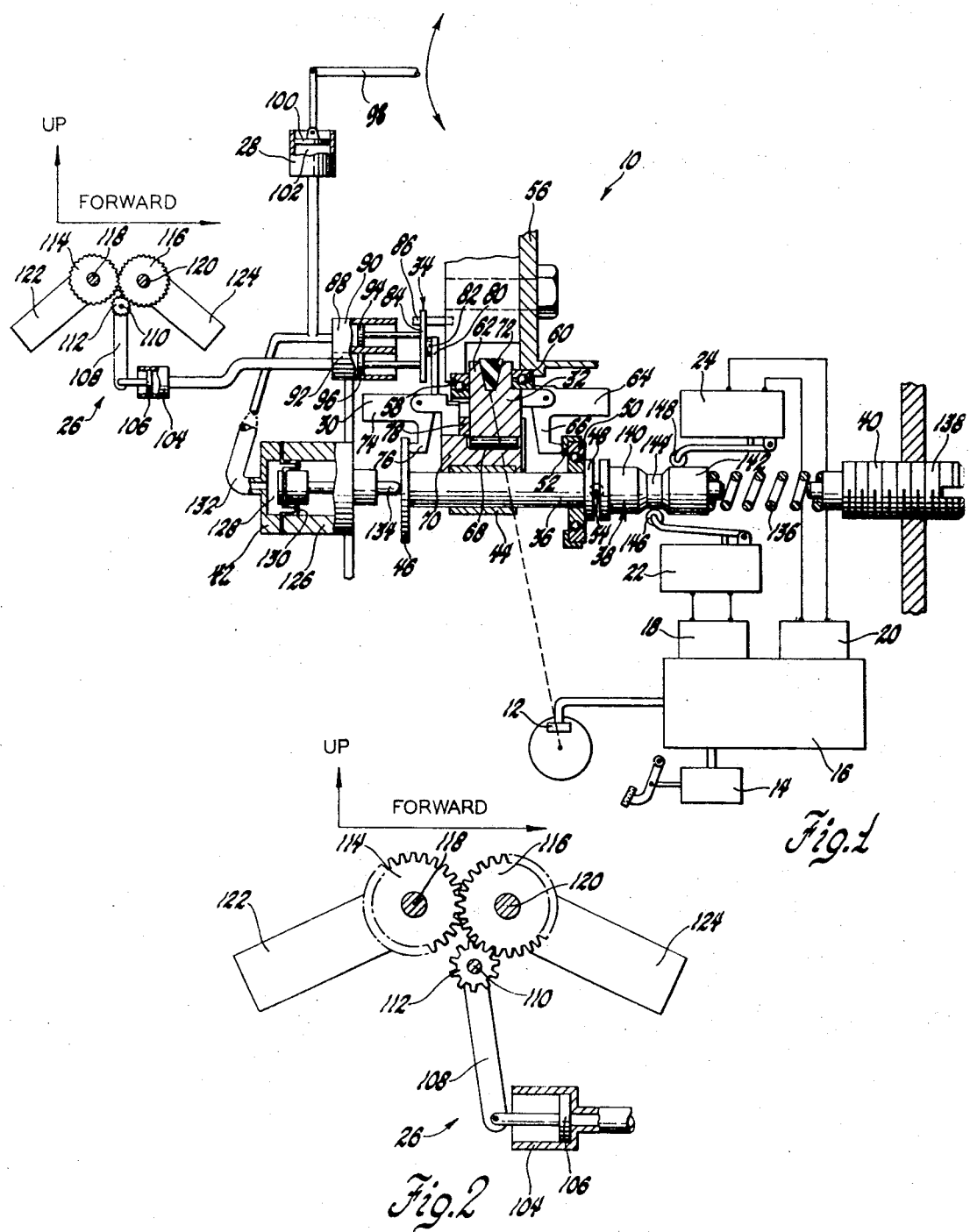

Patented Aug. 14, 1973

INVENTOR.
Edward G. Gaeke
BY
D. D. McGraw
ATTORNEY

ROAD GRADE SENSOR

This is a division of Ser. No. 883,386, filed Dec. 9, 1969, now U.S. Pat. No. 3,632,176.

The invention relates to a road grade sensor and more particularly to a sensor for use in a vehicle wheel brake control system in which wheel-to-road slip is controlled by various parameters including road grade. Systems of this type are commonly referred to as antilock systems. The system in which the invention is disclosed is mechanical-hydraulic in nature, with a mechanical wheel speed sensor, a mechanical vehicle speed simulator, a mechanical-hydraulic torque sensor, a mechanical-hydraulic road speed sensor, and a mechanical-hydraulic wheel slip modifier.

It is a feature of the invention to provide means for generating a signal indicating the grade of the road on which the vehicle is moving to further refine the signal ultimately controlling vehicle wheel braking.

The principal factors causing vehicle deceleration are the braking effort at the wheels, the wheel-to-road torque, and the grade of the road on which the vehicle is moving. Systems of this type have been devised and utilized which measure various parameters relating to braking effort, wheel slip, and road surface conditions. In the parent application it was proposed to further refine such systems by considering the road grade. This is an important part of the overall consideration of system operation when the grade varies to a significant extent. It is well known that vehicles being braked while ascending a large grade may be braked more quickly, while vehicles descending a large grade encounter the reverse braking situation. Road grades also affect systems utilizing speed simulators. The best signal for modifying simulated vehicle speed is to obtain a good representation of actual speed during braking. However, this signal is difficult to keep isolated from vehicle pitch and road grade. Developed braking effort at the wheel, or wheel torque, provides another parameter which may be utilized to modify a vehicle simulated speed signal and bring it in closer approximation with actual vehicle speed. The road grade signal is utilized to counteract errors in vehicle speed acceleration which result when substantial road grades are encountered.

In a preferred complete system utilizing the invention, road grade, brake torque and wheel speed are utilized. A simulated vehicle speed is generated and is modified by wheel brake torque and road grade. The vehicle wheel speed signal and the vehicle simulated speed signal, as modified, are combined and generate a wheel brake apply pressure command signal. This signal may also be modified by a wheel slip sensing device utilizing changes in brake torque to affect the command signal. The command signal is presented as linear movement of a cam for controlling switches, which, in turn, control valves of a wheel brake apply pressure modulator, which, in turn, controls the application and release of wheel brake pressure.

The road grade sensor embodying the invention claimed herein comprises first and second gears in mesh with each other and an output gear in mesh with said first gear, the gears being mounted to rotate about parallel axes extending transversely of the vehicle, and first and second weights respectively secured to the first and second gears to move therewith and extending in a vertical plane perpendicular to the parallel axes with like vertical components of extension and opposite outward components of extension. The road grade sensor is also provided with an output signal generating means actuated by movement of the output gear to generate a road grade signal for use in the vehicle wheel brake control system. The weights act to impress equal and oppositely acting inertial forces on the first and second gears in response to vehicle acceleration and deceleration to maintain these gears in an unchanged equilibrium position. The weights also impress concurrently acting gravitationally caused forces on the first and second gears to rotate these gears to a new position of equilibrium in response to a change in grade of the road on which the vehicle is moving and reflecting road grade through movement of the output gear.

In the drawings:

FIG. 1 is a schematic representation of a system utilizing the invention, with parts broken away and in section.

FIG. 2 is a view of the road grade sensor contained in the system of FIG. 1 and embodying the invention and showing the sensor in a modified position due to change in road grade.

Figure 3:
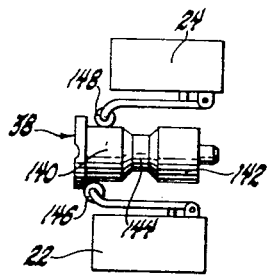
FIGS. 3, 4 and 5 show different positions of the switch operating cam and the switches under different command signal conditions.

The vehicle brake control system 10 of FIG. 1 is provided to control one or more vehicle wheel brakes schematically illustrated as brake 12. A source of brake pressure, such as master cylinder 14, is connected through the wheel brake pressure modulator 16 to the wheel cylinder of the brake 12. Brake 12 may be a front wheel brake, a rear wheel brake, or any desirable combination thereof. The modulator 16 is controlled by valves 18 and 20, which are electrically actuated and are, in turn, respectively controlled by switches 22 and 24. Other than providing an operative structure, the modulator 16, with its valves 18 and 20, form no part of the invention. The modulator may be hydraulically or pneumatically operated under the control of valves 18 and 20. Systems having modulators which may be utilized in practicing the invention are disclosed and claimed in U.S. Pat. No. 3,592,514 issued July 13, 1971 to DeHoff; and U.S. Pat. application Ser. No. 128,484, filed Mar. 26, 1971, which is a continuation of U.S. Pat. application Ser. No. 806,807, filed Mar. 13, 1969 by Van Ostrom et al., now abandoned.

The control system components include the road grade sensor 26 to which the present invention is directed, the brake torque sensor 28, the vehicle speed simulator 30, the wheel speed sensor 32, the vehicle speed simulator modifier 34, the force accumulator link 36, the switch cam 38, the force balance adjuster 40, and the percent slip modifier 42. Some of these components are circumferentially arranged about the axis of link 36, with only the upper portion being shown for simplicity.

The force accumulator link 36 is rotatably and slidably mounted in the bearing and guide 44, has a disc 46 on one end, a bearing retainer 48 on the other end, and mounts the inner race of the thrust bearing 50. The inner race of this bearing abuts retainer 48 and the outer race is provided with a wear ring 52. The end of force accumulator link 36 adjacent bearing retainer 48 forms a part of thrust bearing 50, schematically illustrated as including the center ball 54. Ball 54 engages the end of the switch cam 38 so that linear force is transmitted between link 36 and cam 38, but not rotational force.

The frame 56 anchors the main support bearings 58 and 60 which support the wheel speed sensor 32. Sensor 32 includes a flyweight arrangement to produce a force signal proportional to wheel speed. The sensor includes the annular drive and inertia ring 62, to which are pivotably mounted flyweights 64. Only one such flyweight is shown. The flyweight includes a bellcrank-like arrangement with the arm 66 having its end engaging the wear ring 52. As the flyweight 64 moves radially outward, it urges the force accumulator link 36 to the right through arm 66 and thrust bearing 50. A one-way clutch and bearing arrangement 68 is provided on the inner periphery of ring 62, and includes inertia ring 70. This ring mounts bearing and guide 44. The outer periphery of ring 62 is formed as a pulley and receives drive belt 72. This belt is suitably driven by the wheel associated with wheel brake 12; this construction being schematically illustrated. In practice, other driving arrangements may be made. Also, in some instances, the drive may be from the vehicle drive shaft which drives both rear wheels through the differential. As used herein, the term wheel speed sensing is considered to be sufficiently broad to include sensing rotational speed through such drive arrangements. Therefore, signals generated in accordance with or related to wheel speed are considered to include such variations.

Ring 70 is also a part of the vehicle speed simulator 30 and has flyweights pivotably secured thereto, one such flyweight 74 being illustrated. This flyweight is similar in construction to flyweight 64 and includes a bellcrank arm 76, which has its outer end engaging the disc 46 so that radially outward movement of flyweight 74 causes a leftward force to be exerted on force accumulator link 36 through arm 76 and disc 46.

The one-way clutch and bearing unit 68 provides the means for transmitting wheel accelerating motion to the vehicle speed simulator and then allows the vehicle speed inertia ring 70 freedom to overrun the wheel speed sensor ring 62 when the wheel decelerates. A thrust bearing 78 between a part of ring 70 and a part of ring 62 supports the reaction force to the vehicle speed simulator signal. The vehicle speed simulator operates to produce a force signal proportional to simulated vehicle speed.

The overrunning action of inertia ring 70 will simulate vehicle speed so that the simulated speed is approximately the same as actual vehicle speed when the wheel is decelerated.

The vehicle speed simulator modifier 34 includes an annular brake disc 80 which is provided with a suitable friction braking material 82, an annular friction plate 84 which is guided in axial movement by guide pins 86, and plate actuating means 88. The actuating means includes a housing having cylinders 90 and 92 formed therein and in which piston 94 and 96 are respectively mounted for reciprocation. The pistons are connected to plate 84 so that, as they are urged to the right by pressure in their respective cylinder, they increase the engaging force acting on the plate against brake lining 82. As the force acting on plate 84 increases, the inertia ring 70 is caused to decelerate in proportion to vehicle deceleration caused by brake torque and the road grade over which the vehicle is operating.

In order to accomplish this, the brake torque sensor 28 is connected so that its torque sensing input arm 98 acts through its piston 100 to pressurize hydraulic fluid in its cylinder 102. Cylinder 102 is fluid connected to cylinder 90 in a closed circuit so that an increase in pressure occurs in cylinder 90 in accordance with an increase in pressure in cylinder 102. Cylinder 102 is also fluid connected to the percent slip modifier 42 as will be described.

The road grade sensor 26, embodying the invention herein claimed, acts to generate a pressure in its cylinder 104, which is fluid connected to cylinder 92 through a closed circuit so that the pressure in cylinder 92 is in proportion to the pressure generated in cylinder 104. The piston 106 of road grade sensor 26, acting in cylinder 104, is schematically illustrated as being moved by arcuate movement of arm 108 about the axis 110 of the road speed sensor output gear 112. The road speed sensor 26 also includes gears 114 and 116, respectively mounted for rotation about their axes 118, 120. Gears 114 and 116 are meshed with each other, and gear 116 is meshed with gear 112. Thus, gear 112 follows arcuate movement of the other two gears, and those other two gears are connected to act together. The gear axes 110, 118 and 120 are parallel to each other and extend transversely of the vehicle in which the system is installed. This is indicated by the diagrammatic showing of the forward direction and upward direction of the vehicle. Gear 114 has a weight 122 secured to it, and gear 116 has a similar weight 124 secured to it. These weights are movable with their respective gears about axes 118 and 120 in a vertical plane perpendicular to the gear axes and parallel to the vehicle center line. The weights have like vertical components of extension; that is, they both have a downward component extension, as illustrated, or may both have an upward component of extension; and they further extend with opposite outward components of extension. Thus, weight 122 has a rearward component of extension in relation to the vehicle and weight 124 has a forward component of extension in relation to the vehicle. It is preferable to attach the road speed sensor unit to the vehicle axle to eliminate the effects of body deflection allowed by the vehicle during deceleration. The sensor creates an hydraulic pressure signal in cylinder 92, in accordance with the grade of the road on which the vehicle is moving. This pressure generates a force signal transmitted through piston 96 to plate 84. This force signal modifies the simulated vehicle speed signal to compensate for the effect of road grade on vehicle deceleration. The road grade sensor weights 122 and 124 act with equal and opposite torques on their respective gears 114 and 116, resulting from the force of gravity on the weights. This results in a position of equilibrium in which there is no net torque output from the weights so long as there is no change in road grade. Vehicle acceleration and deceleration will not change the weight equilibrium position since the weights experience equal and opposite inertia forces in response to vehicle acceleration and deceleration. Therefore, the gears 114 and 116 are maintained in the unchanged equilibrium position.

When the road grade changes to an upward grade, the torque output of weight 124 increases while the torque output from weight 122 decreases because of the change in effective torque arm length, assuming the vehicle to be traveling in a forward direction up the grade. This results in a torque imbalance transmitted through gear 116 to output gear 112, arm 108, and piston 106 to increase the hydraulic pressure in cylinders 104 and 92. When the vehicle is being driven forwardly and encounters a descending road grade, the reverse situation occurs and the resulting torque imbalance is transmitted to cause a decrease in pressure in cylinders 104 and 92. Thus, the amount of force generated by pressure in cylinder 92, and acting on plate 84, varies in accordance with the road grade. The road grade signal causes an increase in braking force on lining 82 when an ascending grade is encountered, thereby modifying the simulated vehicle speed signal to account for the faster vehicle speed deceleration under such circumstances.

The percent slip modifier 42 includes a housing 126 with a chamber 128 and a power wall 130, sealing one end of the chamber. The chamber is fluid connected to the closed hydraulic system of the brake torque sensor 28 through conduit 132. Therefore, the pressure signal indicating brake torque, generated in cylinder 102, is delivered to move the power wall 130. A push rod 134 is connected to be moved by power wall 130 and has its outer end engaging the end of force accumulator link 36 on which disc 46 is provided. Thus, the percent slip modifier utilizes the brake torque signal to modify the summation of the simulated and modified vehicle speed signal and the wheel speed signal as they are applied to the force accumulator link.

The force balance adjuster 40 includes a compression spring 136 engaging the end of switch cam 38 opposite torque bearing 54 and a spring compression force adjuster, illustrated as adjusting screw 138. The compression force of spring 136 is adjusted to balance the force accumulator link so as to properly index the switch cam.

The switch cam includes a pair of lands 140 and 142 separated by a beveled groove 144. Switch 22 has a cam follower 146 and switch 24 has a cam follower 148. These followers are in engagement with the cam 38 and ride on either land 140 or land 142 or in groove 144. As is more particularly shown in FIG. 3, when the system is in the brake pressure apply condition, both switches 22 and 24 are held open since their cam followers 146 and 148 are both in engagement with cam land 140.

Figure 4:
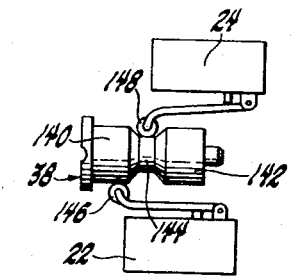
Figure 5:
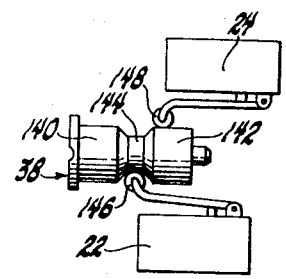
Figure 6:
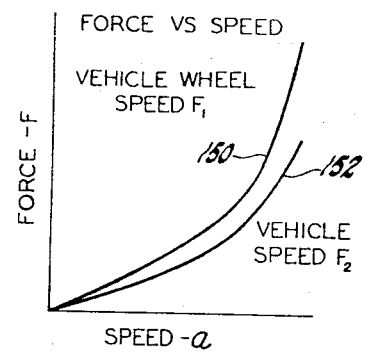
FIG. 6 shows the general characteristics and relationship between the command signal and the sensed speed and the wheel speed sensor and the vehicle speed simulator, the command signal being plotted as a force.
Figure 7:
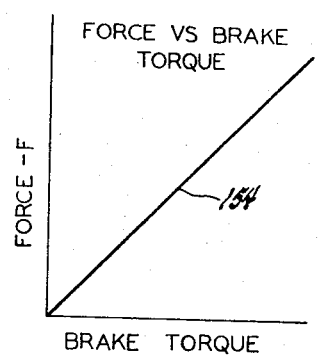
FIG. 7 shows the general characteristics and relationship between the brake torque signal, plotted as a force, and the torque developed by the wheel brake.

When the command signal generated by the system is such that the force accumulator link moves leftwardly to require a brake pressure release position, it moves through the brake pressure slow apply position of FIG. 4 to the brake pressure release position of FIG. 5. In the brake release position, cam follower 146 is in groove 144 so that switch 22 is closed. Cam follower 148 engages land 142 so that switch 24 is open. In this condition, valve 18 will be open while valve 20 will be closed, controlling the modulator 16 to release wheel brake apply pressure delivered to the brake 12. When the force accumulator link 36 moves cam 38 rightwardly from the brake pressure release position, it establishes the brake pressure slow apply position of FIG. 4 in which switch 22 is open and switch 24 is closed. This causes the modulator 16 to slowly apply the brake apply pressure. Further rightward movement of the force accumulator link 36 and of cam 38 returns the system to the brake pressure apply position shown in FIG. 3. In this position, pressure from the master cylinder 14 is delivered to the brake 12.

Figure 8:
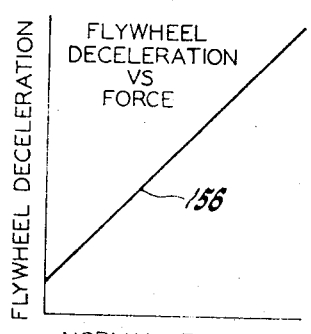
FIG. 8 shows the general characteristics and relationship between the inertia wheel speed and the sum of forces acting on the vehicle speed simulator modifier unit.
Figure 9:
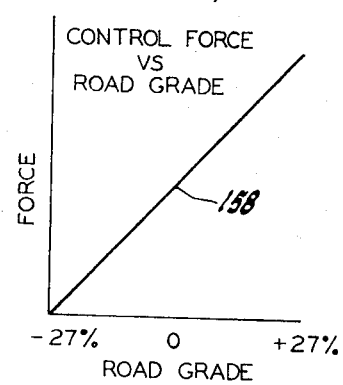
FIG. 9 shows the general characteristics and relationship between the anticipated road grade range and the road grade output signal generated by the road grade sensor and shown as a force.
Figure 10:
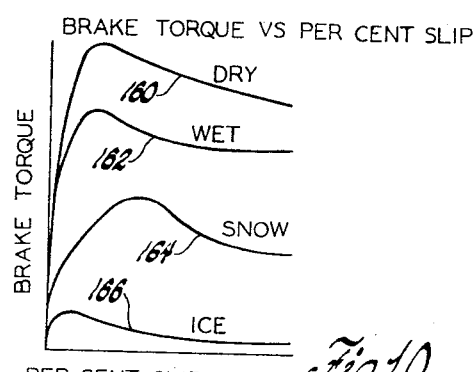
FIG. 10 shows the general characteristics and relationship between the coefficient of friction, or brake torque, and percent of wheel slip for various road surface conditions.

The graphs of FIGS. 6 through 10 relate the output signal to the generating parameter. The curves are provided as examples, and curves for any particular hardward may vary somewhat, but will follow the general pattern set forth. The output signals are illustrated as forces plotted against speed in FIG. 6. Curve 150 indicates the force signal obtained from the vehicle wheel speed sensor 32. Curve 152 indicates the force signal generated by the vehicle speed simulator 30. Curve 154 of FIG. 7 indicates the force signal generated by the brake torque sensor 28. Curve 156 of FIG. 8 plots flyweight deceleration against the force signals acting through the vehicle speed simulator modifier 34. Curve 158 of FIG. 9 plots the force signal of the road grade sensor through a range of road grades from a 27% descending grade to a 27 percent ascending grade. Curves 160, 162, 164 and 166 plot brake torque against the percent slip of the wheel to the road surface with four different road surface conditions. These conditions relate to a dry concrete surface; a wet road surface; a road surface covered with snow, and an ice covered road surface. These four curves have been well established in the prior art.

The operational sequence occurring in the system will now be described. In the normal condition of operation of the vehicle brake system, the cam 38 is in the position shown in FIG. 3 and the vehicle brakes operate without being affected by the control system. When the vehicle is driven on a road at a steady speed, the vehicle speed inertia ring 70 and the wheel speed inertia ring 62 will be driven at the same speed. The wheel speed ring 62 drives the vehicle speed ring 70 through the one-way clutch 68. The force signals generated by these two sensors are equal and, therefore, the force exerted in opposite directions on force accumulator link 36 are equal and opposite. In this force balance condition, with the brakes being released, spring 136 holds the force accumulator link 36 and the cam 38 in the brake apply position illustrated in FIG. 3. When the vehicle brakes are applied, the vehicle wheel, to which wheel speed sensor is operationally connected by belt 72, decelerates. This causes a deceleration of ring 62 and flyweights 64. However, by action of the one-way clutch 68, the vehicle speed simulator ring 70 overruns due to its inertia. The control force balance therefore changes with this differential in speed between the two speed sensor units, tending to move the force accumulator link 36 leftwardly. In addition, the brake torque sensor 28 generates a brake torque signal acting through piston 94 and the vehicle speed simulator modifier 34 to decelerate the ring 70 in accordance with brake torque, causing another force signal change.

The comparison of these force signals results in a command signal generated as a force signal transmitted from the force accumulator link to switch cam 38, and spring 136 moves the switch cam leftwardly. When the percent slip, or wheel speed separation from vehicle speed, is sufficiently large, cam 38 will be located in the brake pressure slow apply position shown in FIG. 4. The slow apply brake pressure will allow a gradual increase in brake effort which will also increase the brake torque developed and thus increase the force signal generated by the brake torque sensor. This increased signal acting on the vehicle speed simulator 30 through the modifier 34 will offset the decreased force signal accomplished by the decrease in wheel speed as sensed by wheel speed sensor 32. This will continue until the wheel-to-road torque cannot be increased. This point occurs at the high point of the appropriate curve of FIG. 10. Beyond this point, the vehicle wheel will have a large deceleration and brake torque will also decrease. The force balance will shift, causing the force accumulator link 36 to be moved further leftwardly by the command signal until the switch cam 38 is in the brake release position of FIG. 5. This will further reduce the brake torque and will allow the vehicle wheel to accelerate. When the wheel speed has increased sufficiently to develop a substantially large force signal by means of the wheel speed sensor to again change the command signal, the force accumulator link 36 and the cam 38 will be moved to the right, and cam 38 will assume either the slow apply or the full apply position depending on the magnitude of the signal, which, in turn, depends on the magnitude of the speed differences.

Control of the deceleration of the inertia ring 70, utilized to simulate vehicle speed, is regulated by the amount of force exerted through the modifier 34. In addition to the brake torque force signal, the road grade sensor 26 generates another force signal acting through piston 96 and brake plate 84. By combining brake torque signals and road grade signals, the vehicle speed simulator ring 70 is decelerated to provide a good approximation of actual vehicle speed. Furthermore, the percent slip modifier acts in accordance with changes in brake torque to modify the summation of signals from the wheel speed sensor 32 and the vehicle speed simulator 30, as modified through modifier 34, to further refine the command signal.

The following charted information provides a ready comparison of conditions of various elements of the system under each condition of operation.

While in the above description reference is generally made to sensing speeds, it is also within the scope of the disclosure to sense decelerations and accelerations and to utilize signals of this nature. Such signals are therefore also referred to as movement characteristic signals. The invention is disclosed as a part of a mechanical-hydraulic system, but may also be practiced in combination with other types of sensing and signal accumulating or combining devices. The elements of the control system may be electrical, pneumatic or hydraulic, or a combination thereof. The type of vehicle braking system in which the invention is utilized may be other than the hydraulic system schematically illustrated, such as positive air pressure, electrical, or electromagnetic in nature. It is only in its more specific aspects, as more particularly disclosed and claimed herein, that the invention applies to a mechanical road grade sensor in a mechanical system.

What is claimed is:

1. For use in a vehicle, a road grade sensor comprising:

first and second gears in mesh with each other and an output gear in mesh with said first gear, said gears being mounted to rotate about parallel axes extending transversely of the vehicle;

and first and second weights respectively secured to said first and second gears to move therewith, said weights extending in a vertical plane perpendicular to said axes with like vertical components of extension and opposite outward components of extension;

said weights impressing equal and oppositely acting inertial forces on said first and second gears in response to vehicle acceleration and deceleration to maintain said gears in an unchanged equilibrium position, and impressing concurrently acting gravitationally caused forces on said first and second gears to rotate said gears to a new position of equilibrium in response to a change in grade of the road on which the vehicle is moving and reflecting road grade through movement of said output gear.

2. For use in a vehicle wheel brake control system to modify braking action in accordance with the changes in grade of the road on which the vehicle is moving, a road grade sensor comprising:

first and second gears in mesh with each other and an output gear in mesh with said first gear, said gears being mounted to rotate about parallel axes extending transversely of the vehicle;

| | | | Master cylinder pressurized | | |
|---|---|---|---|---|---|
| Unit or signal | Master cylinder released | Brakes applied—normal | Brakes applied—wheel slipping | Brakes released | Brakes released |
| Vehicle wheel speed ($S_1$) | Steady state | Decelerate | Decelerate | Accelerate | Decelerate. |
| Vehicle speed ($S_2$) | do | do | do | Decelerating | Do. |
| Vehicle speed control force signal ($F_2$) | $S_1=S_2$ | $S_1=S_2$ | $S_1<S_2$ | $S_1<S_2$ | $S_1<S_2$. |
| Vehicle wheel speed control force signal ($F_1$) | $F_1>F_2$ | $F_1>F_2$ | $F_1<F_2$ | $F_1<F_2$ | $F_1<F_2$. |
| Wheel brake torque control force signal ($F_3$) | 0 | Increasing | Steady to decreasing | Decreasing | Decreasing. |
| Command signal—summation of control force signals ($F_1-F_2+F_3$). | + | + | 0 | − | −. |
| Vehicle speed simulator flywheel braking torque. | Zero | Zero or increasing | Very slowly increasing | Decreasing | Decreasing. |
| Response rate | Fast | Fast | Gradually | Fast | Fast. |
| Switch cam position | To right | To right | Center | To left | To left. |
| Switch condition: | | | | | |
| Switch 24 | Open | Open | Closed | Open | Open. |
| Switch 22 | do | do | Open | Closed | Closed. |
| Modulator hydraulic section | Open to master cylinder. | Open to master cylinder or increasing pressure. | Closed to master cylinder and increasing pressure or moving toward reopening to master cylinder pressure. | Closed to master cylinder and decreasing pressure or moving toward valve closing. | Closed to master cylinder and decreasing pressure or moving toward valve closing. |
| Brake apply pressure | None | Increasing | Gradually increasing | Decreasing | Decreasing. |
| Brake torque | do | do | do | do | Do. | first and second weights respectively secured to said first and second gears to move therewith, said weights extending in a vertical plane perpendicular to said axes with like vertical components of extension and opposite outward components of extension;

and an output signal generating means actuated by movement of said output gear to generate a road grade signal for use in the vehicle wheel brake control system;

said weights impressing equal and oppositely acting inertial forces on said first and second gears in response to vehicle acceleration and deceleration to maintain said gears in an unchanged equilibrium position, and impressing concurrently acting gravitationally caused forces on said first and second gears to rotate said gears to a new position of equilibrium in response to a change in grade of the road on which the vehicle is moving and reflecting road grade through movement of said output gear.

* * * * *

UNITED STATES PATENT OFFICE
CERTIFICATE OF CORRECTION

Patent No. 3,752,251    Dated August 14, 1974

Inventor(s) Edward G. Gaeke

It is certified that error appears in the above-identified patent and that said Letters Patent are hereby corrected as shown below:

| Unit Or Signal | Master Cylinder Released | MASTER CYLINDER PRESSURIZED | | | |
| --- | --- | --- | --- | --- | --- |
| | | Brakes Applied- Normal | Brakes Applied- Wheel Slipping | Brakes Released | Brakes Released |
| Vehicle Wheel Speed ($S_1$) | Steady State | Decelerate | Decelerate | Accelerate | Decelerate |
| Vehicle Speed ($S_2$) | Steady State | Decelerate | Decelerate | Decelerating | Decelerate |
| Vehicle Speed Control Force Signal ($F_2$) | $S_1 = S_2$ | $S_1 = S_2$ | $S_1\ \ S_2$ | $S_1\ \ S_2$ | $S_1\ \ S_2$ |
| Vehicle Wheel Speed Control Force Signal ($F_1$) | $F_1\ \ F_2$ | $F_1\ \ F_2$ | $F_1\ \ F_2$ | $F_1\ \ F_2$ | $F_1\ \ F_2$ |
| Wheel Brake Torque Control Force Signal ($F_3$) | 0 | Increasing | Steady to decreasing | Decreasing | Decreasing |
| Command Signal - Summation of Control Force Signals ($F_1-F_2+F_3$) | + | + | 0 | - | - |
| Vehicle Speed Simulator Flywheel Braking Torque | Zero | Zero or increasing | Very slowly increasing | Decreasing | Decreasing |
| Response Rate | Fast | Fast | Gradually | Fast | Fast |
| Switch Cam Position | To right | To right | Center | To left | To left |
| Switch Condition | | | | | |
| Switch 24 | Open | Open | Closed | Open | Open |
| Switch 22 | Open | Open | Open | Closed | Closed |
| Modulator Hydraulic Section | Open to Master Cylinder | Open to Master Cylinder or increasing pressure | Closed to Master Cylinder and increasing pressure or moving toward reopening to Master Cylinder pressure | Closed to Master Cylinder and decreasing pressure or moving toward valve closing | Closed to Master Cylinder and decreasing pressure or moving toward valve closing |
| Brake Apply Pressure | None | Increasing | Gradually increasing | Decreasing | Decreasing |
| Brake Torque | None | Increasing | Gradually increasing | Decreasing | Decreasing |

Signed and sealed this 11th day of February 1975.

(SEAL)
Attest:

RUTH C. MASON
Attesting Officer

C. MARSHALL DANN
Commissioner of Patents
and Trademarks